United States Patent [19]

de Menibus

[11] Patent Number: 4,674,535
[45] Date of Patent: Jun. 23, 1987

[54] SELF-CLOSING CONNECTOR

[75] Inventor: Olivier H. de Menibus, Etampes, France

[73] Assignee: Appareillages et Materiels de Servitudes, Resnes, France

[21] Appl. No.: 785,700

[22] Filed: Oct. 9, 1985

[30] Foreign Application Priority Data

Oct. 11, 1984 [FR] France ............................... 84 15582

[51] Int. Cl.$^4$ ....................... F16L 37/28; F16K 39/00
[52] U.S. Cl. ................... 137/614.03; 251/282
[58] Field of Search .............. 137/614.03; 251/282, 251/149.6, 149.8

[56] References Cited

U.S. PATENT DOCUMENTS

| | | | |
|---|---|---|---|
| 2,451,441 | 10/1948 | Main, Jr. | 137/614.03 |
| 2,765,181 | 10/1956 | Butterfield | 251/282 |
| 2,854,259 | 9/1958 | Clark | 137/614.03 |
| 3,195,935 | 7/1965 | Beebee | 137/614.03 |
| 3,446,245 | 5/1969 | Snyder, Jr. | 137/614.03 |
| 3,464,436 | 9/1969 | Bruning | 137/614.03 |
| 4,086,939 | 5/1978 | Wilcox | 137/614.03 |

FOREIGN PATENT DOCUMENTS 2117073A 10/1983 United Kingdom .

Primary Examiner—A. Michael Chambers
Attorney, Agent, or Firm—Sughrue, Mion, Zinn, Macpeak & Seas

[57] ABSTRACT

A self-closing connector in accordance with the invention comprises at least one duct, at least one end orifice, and a sliding valve plate for closing said orifice, the connector is essentially characterized by the fact that said orifice (11, 28, 29, 32) is delimited by at least two lines of sealing (17, 26) disposed on respective closed curves and each belonging to a respective one of two cylindrical surfaces having generator lines extending in the same direction, and in that the sliding valve plate 12 has at least two sealing (12) surfaces belonging to said cylindrical surfaces respectively, with the projection of the section areas of the valve plate which co-operate with respective one of said two sealing lines on a plane P perpendicular to said generator lines having values equal to $S'_1$ and $S'_2$. Said section areas are chosen to be equal. This enables the effects of externally-applied pressure to cancel.

10 Claims, 3 Drawing Figures

SELF-CLOSING CONNECTOR

The present invention relates to self-closing connectors, i.e. connectors for fluid ducts which enable the ends of two ducts which may contain fluid under pressure to be interconnected without there being any need to empty the ducts and without there being any ingress of fluid of loss of fluid to or from the surrounding medium, e.g. air or salt water if the connector is used at sea.

BACKGROUND OF THE INVENTION

Self-closing connectors are well known and are used in many applications, and in particular in those applications requiring a high degree of security, for example aeronautics, where they are used for the hydraulic controls of an aircraft and for verification thereof.

Such a connector is essentially constituted by a duct through a body, the duct being terminated by a seat-forming orifice, together with a sliding valve plate inside the duct and on which a pressure spring acts in such a manner as to hold the valve plate against the seat. In broad outline, a connector thus comprises a male portion and a female portion which are complementary to each other. When these two connector portions are not coupled to one another, they are closed by their respective valve plates. Under such conditions no fluid can escape from the ducts to which the connector portions are associated and, likewise, no gaseous, solid, or liquid impurities can enter the ducts.

When it is necessary to interconnect two ends, they are brought into end-to-end contact and pressed against each other, thereby, in a preliminary stage, opening a first one of the two valve plates to release fluid under pressure from the associated duct, which fluid, in a second stage, exerts pressure on the other valve plate and moves it in turn, thus opening the orifice with which the second valve plate is associated. The second valve orifice could alternatively be opened mechanically. Means are also provided for locking the two connectors portions together to prevent them from coming apart accidentally.

As a consequence from the above outline, it can be seen that the two valve plates in the two connector portions are displaced from their respective seats to provide fluid continuity between their ducts, and the two ducts are then interconnected with the above-mentioned advantages.

However, in some applications, such connectors have a considerable drawback. It may happen that connectors with given characteristics, as described above, are used in surroundings where the ambient pressure is high, and in particular where the ambient pressure may be high enough to exert an opening force on the face of a valve plate, in spite of the opposing forces exerted thereon by its return spring and by the fluid under pressure inside the duct. This applies, in particular, to self-closing connectors used underwater at depth.

Preferred embodiments of the present invention mitigate this drawback and provide a self-closing connector of the type having sliding valve plates, which connector is insensitive to the pressure of the ambient medium in which it is used.

SUMMARY OF THE INVENTION

The present invention provides a self-closing connector comprising:
a duct;
an orifice at the end of said duct, said orifice being delimited by at least two closed curve lines of sealing, each belonging to a respective cylindrical surface having generator lines extending in the same direction; and
a valve plate having sealing surfaces at least which belong to said respective cylindrical surfaces, each of said sealing surfaces being suitable for sliding over a respective one of said sealing lines, the projections, on a plane perpendicular to said generator lines, of the section areas of the valve plate which co-operate with respective ones of said sealing lines being equal in value.

BRIEF DESCRIPTION OF THE DRAWING

An embodiment of the invention is described by way of example with reference to the accompanying drawings, in which.

MORE DETAILED DESCRIPTION

Figure 1:
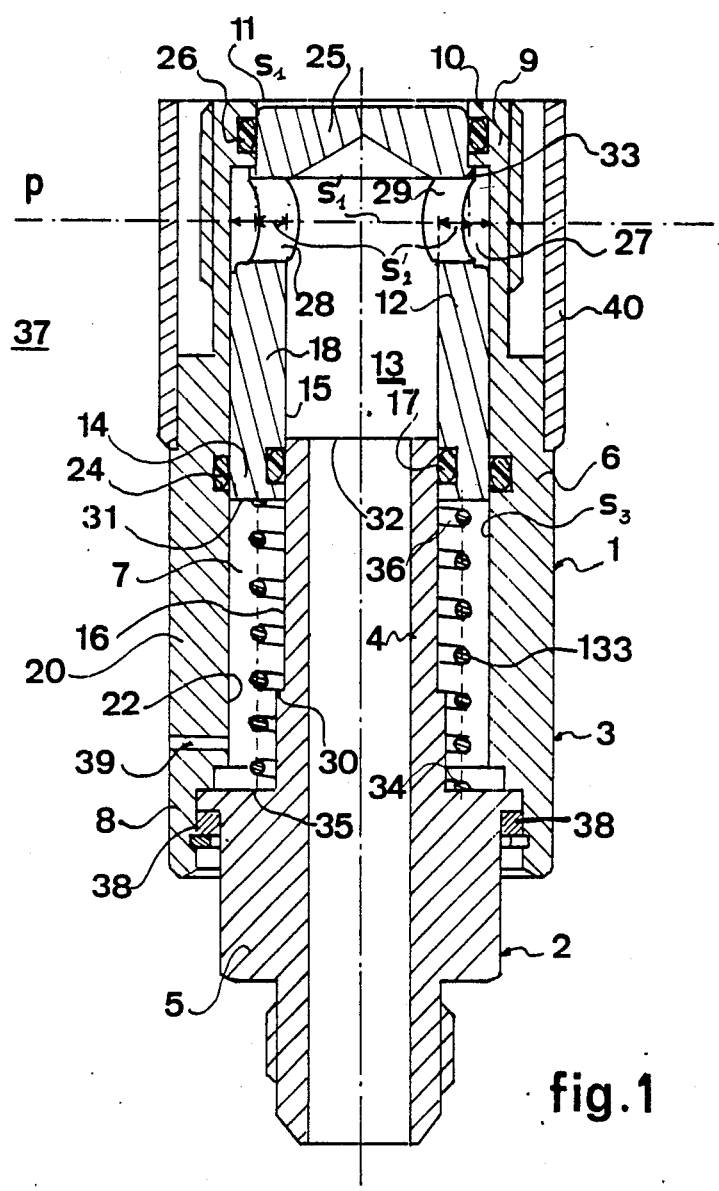
FIG. 1 is a longitudinal section through a first self-closing connector portion in accordance with the invention.

With particular reference to FIG. 1, a first self-closing connector portion 1 is intended for fitting to the end of a duct for fluid under pressure, e.g. for oil under pressure.

This connector portion comprises a body which is made up of two parts 2 and 3. A first, or inner part is generally cylindrical and includes a barrel 4 which is fixed to a base 5 having a fitting for connection to pipework or ducting for connection to other pipework or ducting. A second, or outer, part 3 is generally constituted by a sleeve 6 which surrounds the barrel and which extends slightly beyond the end of the barrel, with the sleeve 6 and the barrel 4 defining a circular cavity 7 that is closed at the bottom by the base 5. One end 8 of the sleeve 6 is fixed, e.g. by three fixing pins, to the base 5. The other end 9 of the sleeve includes an inwardly directed lip 10 delimiting an inlet 11, which is circular in the present example and has a section area $S_1$ which is substantially equal to the central section area $S_3$ inside the sleeve 6 at 20.

This connector portion also includes a valve plate or thimble 12 in the form of a thimble having an inside cavity 13 which is open at one end 14 and whose inside diameter is equal to the outside diameter of the barrel 4 to within mechanical tolerances, thereby enabling the valve thimble to slide axially on the end of the barrel in a sealed manner. A sealing ring 17 provides sealing between the inside face 15 of the valve thimble and the outside face 16 of the barrel. The outside surface of the tubular part 18 of the valve thimble has a surface which is defined in such a manner that its outside diameter is equal to within mechanical tolerances to the section area $S_3$ of the inside surface 22 of the middle portion 20 of the sleeve. The valve thimble thus slides in sealed manner against said inside surface 22, and sealing is obtained by means of a sealing ring 24.

The end 25 of the valve thimble 12 has the same section area as the section area $S_1$ of the above-defined inlet 11 and can thus slide relative thereto in sealed manner as provided by a sealing ring 26 which provides a second line of sealing. The end 25 of the valve thimble is of smaller outside diameter at 27 than is the main tubular portion 18, and fluid communication means are provided through said smaller end portion, e.g. holes 28, 29 passing through the side wall of the valve thimble 12.

Figure 3:
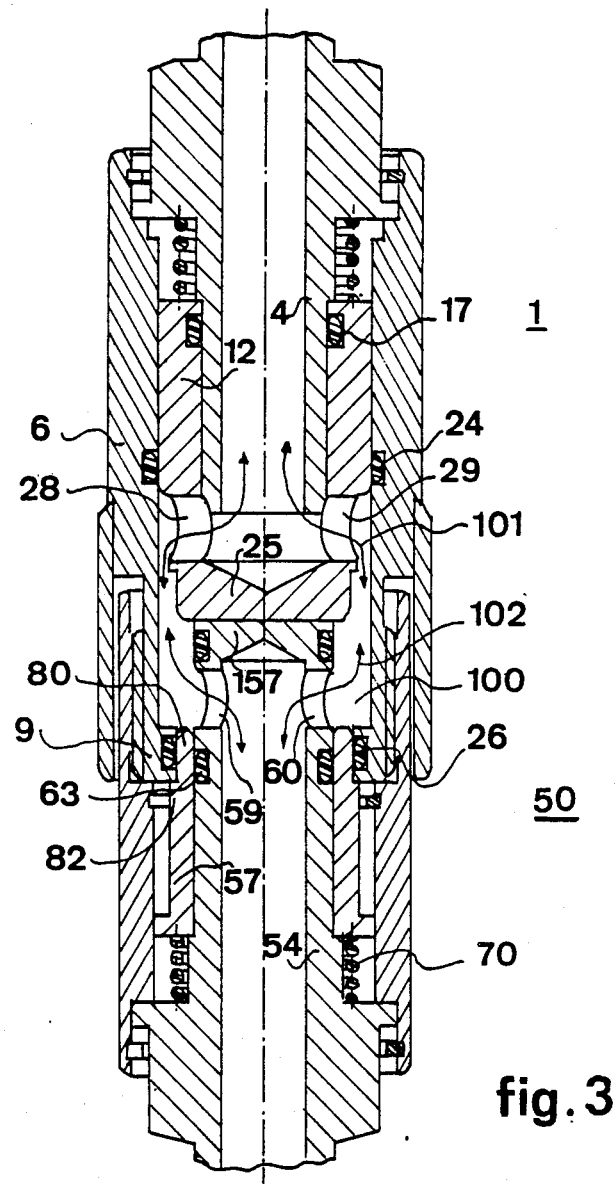
FIG. 3 is a longitudinal section showing the first and second connector portions of FIGS. 1 and 2 connected to each other.

The valve thimble 12 as defined above is thus capable of sliding between first and second end positions defined by respective stops. The first stop is made on the barrel 4 and is constituted by a step 30 in the outside wall of the barrel 4 close to the base 5 so that when the valve thimble 12 slides against the barrel its circular end space 31 it against the step 30 and thus defines and "open" position as can be seen in FIG. 3 in which the end 25 of the thimble has moved out of the inlet 11, and the two holes 28 and 29 are situated level with the front end 32 of the barrel 4.

The second, or "closed", position of the valve is shown in FIG. 1, and the stop is constituted by a step 33 on the outside surface of the thimble. In other words, the reduced diameter end portion 27 of the thimble has two steps in it, the first step defines the beginning of the reduced diameter portion, and the second, smaller step 33 engages behind the lip 10.

Resilient means are associated with the valve 12 to urge it towards its closed position as shown in FIG. 1, in which the end 25 of the valve thimble closes the inlet 11 to the sleeve 6 in a sealed manner. These means for exerting a resilient force are advantageously constitued by a compression spring 133 which is situated in the circular groove as defined above and which bears against the base 5 and the bottom face 31 of the valve thimble. Thus one end 34 presses against the bottom 35 of the circular groove 7 and the other end 36 presses against the face 31 of the valve thimble 12. This spring thus exerts a force which tends to hold the valve thimble in abutment against the inwardly directed lip 10 by means of its step 33.

Means are provided through the sleeve 6 to put the circular cavity 7 into communication with the surroundings 36 in which the self-closing connector is used. Generally speaking, such communication means are obtained by a non-sealed connection between the sleeve 6 and the base 5, thereby enabling the atmosphere to pass through interstices 38 between these two parts. However, in order to clarify the description and to underline the need for such communication means, an orifice 39 extends through the wall of the sleeve 36, which orifice may advantageously contain a filter (not shown) in order to avoid foreign particles entering the groove 7.

Figure 2:
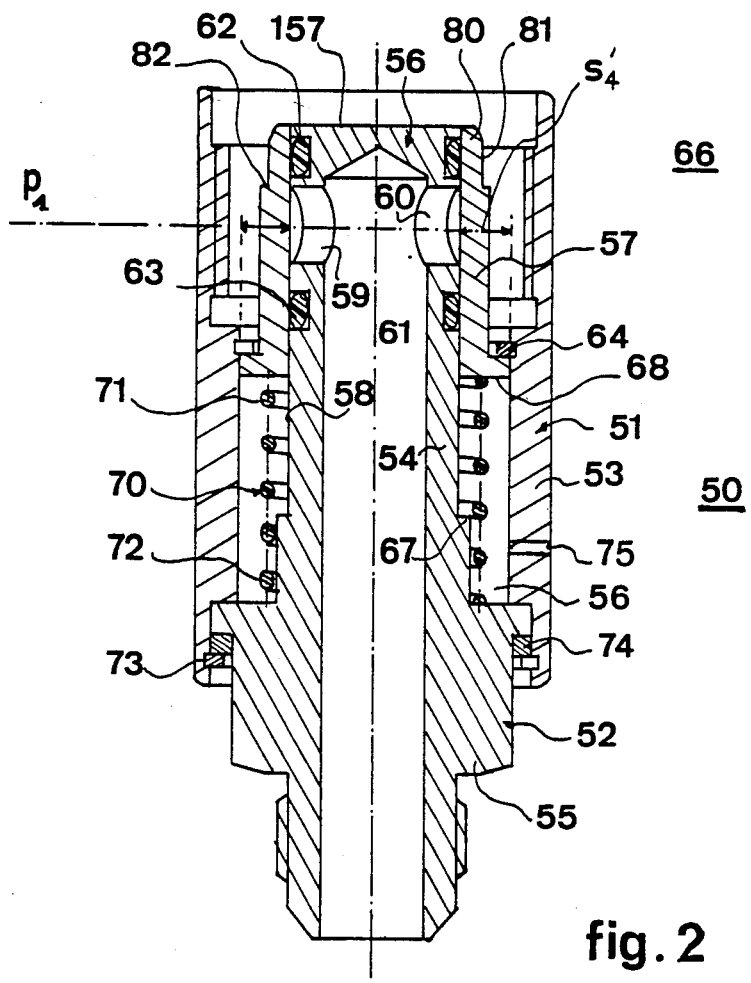
FIG. 2 is a longitudinal section through a second self-closing connector portion in accordance with the invention.

Finally, the outer surface of the sleeve 6 is provided with means for associating such a connector portion with a mating connector portion such as that shown in FIG. 2, which means may be constituted, for example, by a locking ring 40. This ring is not described in greater detail since it is known per se and is already used in self-closing connectors of the prior art.

As mentioned in the introduction, such a self-closing connector is intended to be used in any ambient medium 37 and regardless of the pressure difference which may exist between said medium and the fluid inside the duct which is connected by such a self-closing connector. Thus, in order to prevent the valve thimble 12 from opening under the effect of externally applied pressure, the valve thimble 12 is designed as explained above. Let the effective surface area on which the ambient pressure acts on the bottom end 25 of the valve thimble be equal to a section $S'_1$. This section $S'_1$ is defined by the projection of the section defined by the second line of sealing (sealing ring 26) on a plane P perpendicular to the generator lines which define the various cylindrical parts described above, i.e. the barrel, the tubular portion of the thimble, and the sleeve 6.

Let the effective surface area on which ambient pressure acts on the other end of the valve be equal to a section of value $S'_2$. This other effective area is defined by the first line of sealing given by the sealing ring 17 as projected onto the same plane P. In order to ensure that the forces applied to the valve by the ambient medium cancel, the sections $S'_1$ and $S'_2$ should be equal. Transverse forces are absorbed by the transverse surfaces of the sleeve and the barrel and thus have no effect.

Thus, the forces applied to the respective end faces 25 and 31 of the valve thimble 12 can be made to be equal and the valve remains in safe equilibrium and is never displaced due to the pressure of the medium in which it is immersed. The only effective, or net pressure applied to the valve thimble is the pressure of the fluid inside the barrel 4 and the cavity 13, and the pressure applied by the spring 133.

The above-described connector portion thus has an inlet defined by two lines of sealing respectively defined by the two sealing rings 26 and 17 which are capable of being closed by the valve thimble 12 by virtue of a third line of co-operation defined by the sealing ring 24.

It is quite conceivable that such a connector portion should be mateable with another connector portion which is likewise self-closing.

One such self-closing connector portion capable of cooperating with the connector portion shown in FIG. 1 is shown in FIG. 2. The FIG. 2 connector portion has the same advantages as that described with reference to FIG. 1, in other words external forces acting on the valve plate cancel.

The self-closing connector portion 50 shown in FIG. 2 comprises two parts 51 and 52, with the outer part 51 being constituted by a sleeve 53 and the inner part 52 being constituted by a barrel 54 associated with a base 55. The sleeve 53 and the barrel 54 define a circular cavity 56 similar to that defined above and in which a valve member 57 is free to slide. The valve member 57 is preferably a body of revolution. In this example, the barrel 54 is closed at its end 56 by an end plate 157 whose section is identical to the section of the outside surface 58 of the barrel 54. However, just before the end plate 157, there are holes such as 59 and 60 for putting the inside 61 of the barrel 54 into communication with the inside of the circular cavity 56.

The two holes 59 and 60 shown in FIG. 2 lie between two lines of sealing respectively defined on two cylindrical surfaces by two sealing rings 62 and 63 over which the valve member 57 slides.

The valve is defined so that it is capable of taking up at least two positions, a first, or "closed", position as illustrated in FIG. 2 which is defined by a first stop 64 constituted by a ring snap-fitted into the inside surface of the sleeve 53, with the first position defining the position of the valve member 57 so that its inside surface 65 is simultaneously in co-operation with both lines of sealing defined by the two sealing rings 62 and 63, thereby causing the openings 59 and 60 to be closed by the valve member 57. The inside 61 of the barrel 54 cannot then be put into communication with the ambient or outside medium 66.

The second, or "open", position of the valve member 57 is defined by a step 67 in the outside surface of the barrel 54 against which the end surface 68 of the valve member 57 comes into abutment. In this position, the valve opens the orifices 59 and 60 thus allowing a free passage between the inside 61 of the barrel 54 and the inside of the groove 66.

Means are associated with the valve member 57 to exert a resilient force thereon tending to maintain it constantly against the abutment 64, i.e. in the position in which the two orifices 59 and 60 are closed. These means are constituted by a compression spring 70 disposed inside the above-mentioned circular cavity 56. The respective ends 71 and 72 of the spring 70 are applied against the end surface 68 of the valve member 57 and against the bottom 73 of the cavity 56.

As before, the cavity 56, and more particularly that portion thereof lying between the surface 68 of the valve member 57 and the bottom of the groove 73 is put into communication with the ambient medium 56, either by means of a non-sealed join 74 between the sleeve 53 and the base 52 as mentioned above, or else by means of an orifice directly provided through the wall of the sleeve 53, e.g. an orifice 75 for putting the inside of circular groove 56 into communication with the ambient medium 66 in which the self-closing connector immersed. As with the orifice 39, the orifice 75 is advantageously fitted with a filter in order to prevent foreign bodies from entering the groove 56.

Also as before, such a valve member must not be subjected to a net force by the ambient medim in which it is located in order to prevent the valve opening at an unwanted moment with the consequent passage of impurities into the fluid inside the barrel 54 or the leakage of fluid therefrom.

As before, in order to achieve this aim, the sections on which the external pressure applies, as defined by the projection of two sealing lines defined by the sealing rings 62 and 63 on a plane $P_1$ perpendicular to the generator lines of the valve members, should have equal values. With this particular valve structure, these two sections are two annular sections $S'_4$ which are strictly identical and thus make it easy for the valve member to be in perfect equilibrium, and thus to be unaffected by ambient pressure since the ambient pressure acts equally on two oppositely directed faces both of which are perpendicular to the generator lines of the cylindrical portions of the connector. This is made possible by putting the groove 56 into communication with the surrounding medium, e.g. via the orifice 75.

As mentioned above, this self-closing connector portion is intended to operate with the self-closing connector portion shown in FIG. 1. In order to do this, the end 80 of the valve member 57 has an outside diameter defined in its surface 81 which is equal to the inlet section 11 defined with reference to FIG. 1. Further, the valve member 57 has a step 82 in its outside surface at a distance from its end which is substantially equal to the axial extent of the inwardly directed lip 10, so that the outside end of the lip 10 engages the stop or step 82 of the valve member 57. This can be seen more clearly with reference to FIG. 3 which shows the results of associating the two self-closing connector portions described above with reference to FIGS. 1 and 2.

The two connector portions 1 and 50 are brought together end-to-end so that the end 157 of the barrel 54 comes into contact with the outside surface of the bottom 25 of the thimble 12. Then, by exerting pressure, e.g. manually, the end 9 of the sleeve 6 is caused to penetrate into the open end of the groove 56, and the end 80 of the valve member 57 is caused to penetrate into the inlet orifice 11, so that the end 80 cooperates by abutment against the end 25 and the valve member 57 cooperates by its ouside surface 81 engaging the sealing ring 26. This continues until the stop 82 comes into contact with the lip 10 of the sleeve 6. Then, by continuing to exert pressure on the two connector portions to bring them axially closer together, the barrel 54 penetrates further into the connector 1 and pushes back the valve thimble 12. Thus the valve member 57 slides over the barrel 54 against the force exerted by the spring 70 and the two orifices 59 and 60 are opened to allow free passage nto the space 100 defined in the cavity 7. Likewise, since the valve thimble 12 is pushed away from the sealing ring 26, free fluid passage is provided between the space 100 and the inside of the barrel 54. The paths taken by the fluid are shown by arrows 101 and 102. It can be seen that the paths 101 and 102 defined between the two barrels 4 and 54 are completely sealed and delimited by sealing rings 63, 24 and 26.

Naturally, the end of the sleeve 53 is located between the locking ring 4 and the outside surface of the end of the sleeve 6 so as to hold the two self-closing connector portions 1 and 50 in mechanical engagement with each other in conventional manner.

I claim:

1. A self-closing connector able to act in an outside medium having a certain pressure without inadvertently opening, said connector comprising:
    a tubular duct;
    an orifice at the end of the tubular duct, said orifice being delimited by at least two closed curve lines of sealing, constituted by a respective cylindrical surface having generator lines extending in the same direction; and
    a valve plate slidably concentric to said tubular duct at said orifice having cylindrical corresponding sealing surfaces to said respective tubular duct cylindrical surfaces, each of said valve plate sealing surfaces being suitable for sliding over a respective one of said sealing lines, the projections, on a plane perpendicular to said generator lines, of the section areas of the valve plate which co-operate with respective ones of said sealing lines, being equal in value and means for communicating said valve plate equal section areas to said outside medium, so that the valve plate is maintained in safe equilibrium under said pressure given by the outside medium.

2. A connector according to claim 1, wherein the two cylindrical surfaces having generator lines extending in the same direction are respectively constituted by the outside surface of a barrel and by the inside surface of a inwardly directed portion of a sleeve surrounding said barrel and overlapping it, the sleeve and the barrel defining a cylindrical cavity, and the connector including means to put said cavity into communication with the ambient medium.

3. A connector according to claim 2, wherein said valve plate comprises a valve thimble defining an inside cavity which is delimited by a side surface and by an end, said valve thimble slides such that its side surface moves in said cavity and wherein its inside surface co-operates with the outside surface of said barrel by means of a first sealing ring, and wherein its outside surface co-operates with the inside surface of said sleeve via a second sealing ring, the outside surface of said end co-operating with the inwardly-directed surface of said inwardly-directed lip by means of a third sealing ring.

4. A connector according to claim 3, further including at least two stops defining two positions for said valve thimble, including an open position for said orifice and a position in which said orifice is closed.

5. A connector according to claim 4, further including means for exerting a resilient force on said valve thimble tending to maintain it in its orifice-closing position.

6. A connector according to claim 1, wherein the two cylindrical surfaces having generator lines extending in the same direction are respectively constituted by surface portions situated on either side of at least one orifice through the outer side wall of a cylindrical barrel which is closed by an end plate.

7. A connector according to claim 6, wherein the said valve plate is in the form of a body of revolution sliding over the outer cylindrical surface of said barrel, in such a manner as to co-operate with first and second sealing rings defining first and second lines of sealing respectively located on said two surface portions of said barrel.

8. A connector according to claim 7, further including at least two stops defining two positions of said valve plate, one position in which said orifice is open and another position in which said orifice is closed.

9. A connector according to claim 8, including means for exerting a resilient force on said valve plate tending to mantain it in its orifice-closing position.

10. A connector according to claim 9, including a sleeve surrounding said barrel and said valve plate.

* * * * *